US009800876B2

(12) United States Patent
Banerjee et al.

(10) Patent No.: US 9,800,876 B2
(45) Date of Patent: Oct. 24, 2017

(54) METHOD OF EXTRACTING ERROR FOR PEAK SIGNAL TO NOISE RATIO (PSNR) COMPUTATION IN AN ADAPTIVE SCALABLE TEXTURE COMPRESSION (ASTC) ENCODER

(71) Applicant: SAMSUNG ELECTRONICS CO., LTD., Suwon-si (KR)

(72) Inventors: Krishanu Banerjee, West Bengal (IN); Praveen Kumar Nelam, Karnataka (IN); Subramanian Parameswaran, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/064,794

(22) Filed: Mar. 9, 2016

(65) Prior Publication Data

US 2016/0269752 A1 Sep. 15, 2016

(30) Foreign Application Priority Data

Mar. 9, 2015 (IN) .......................... 1143/CHE/2015

(51) Int. Cl.
| | |
|---|---|
| *G06K 9/36* | (2006.01) |
| *H04N 19/182* | (2014.01) |
| *H04N 19/593* | (2014.01) |
| *H04N 19/124* | (2014.01) |
| *H04N 19/154* | (2014.01) |
| *H04N 19/94* | (2014.01) |
| *H04N 19/176* | (2014.01) |

(52) U.S. Cl.
CPC ......... *H04N 19/182* (2014.11); *H04N 19/124* (2014.11); *H04N 19/154* (2014.11); *H04N 19/593* (2014.11); *H04N 19/94* (2014.11); *H04N 19/176* (2014.11)

(58) Field of Classification Search
CPC ... H04N 19/154; H04N 19/176; H04N 19/182
See application file for complete search history.

(56) References Cited

U.S. PATENT DOCUMENTS

| 2014/0023287 A1* | 1/2014 | Strom | ..................... G06T 9/004 |
| | | | 382/243 |
| 2014/0193081 A1* | 7/2014 | Nystad | ................... H04N 19/90 |
| | | | 382/197 |

OTHER PUBLICATIONS

Nystad, J., et al. "Adaptive Scalable Texture Compression.", 2012.*
Ström, Jacob, and Tomas Akenine-Möller. "i PACKMAN: High-quality, low-complexity texture compression for mobile phones." Proceedings of the ACM SIGGRAPH/EUROGRAPHICS conference on Graphics hardware. ACM, 2005.*

* cited by examiner

*Primary Examiner* — Li Liu
(74) *Attorney, Agent, or Firm* — Sughrue Mion, PLLC (57) ABSTRACT

A method of extracting error for peak signal to noise ratio (PSNR) computation in an adaptive scalable texture compression (ASTC) encoder. The method includes identifying a pixel positions of a pixel in a coded block. The pixel position corresponds to an index in a decimated weight block. The method extracts an error value corresponding to the identified pixel position for said PSNR computation in said ASTC encoder.

12 Claims, 6 Drawing Sheets

Decimated Weight Estimate (5X6) → Coded Block (8X8)

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

Coded Block (8X8)

Last Neighbouring Weights Contributing to Error Value of Pixels in the Coded Block

| 0 | 1 | 2 | 2 | 3 | 3 | 4 | 4 |
|---|---|---|---|---|---|---|---|
| 5 | 6 | 7 | 7 | 8 | 8 | 9 | 9 |
| 10 | 11 | 12 | 12 | 13 | 13 | 14 | 14 |
| 15 | 16 | 16 | 17 | 18 | 18 | 19 | 19 |
| 15 | 16 | 16 | 17 | 18 | 18 | 19 | 19 |
| 20 | 21 | 22 | 22 | 23 | 23 | 24 | 24 |
| 25 | 26 | 27 | 27 | 28 | 28 | 29 | 29 |
| 25 | 26 | 27 | 27 | 28 | 28 | 29 | 29 |

| Index | Count | Positions | | | |
|---|---|---|---|---|---|
| 0 | 1 | 0 | | | |
| 1 | 1 | 1 | | | |
| 2 | 2 | 2 | 3 | | |
| 3 | 2 | 4 | 5 | | |
| 4 | 2 | 6 | 7 | | |
| 5 | 1 | 8 | | | |
| 6 | 1 | 9 | | | |
| 7 | 2 | 10 | 11 | | |
| 8 | 2 | 12 | 13 | | |
| 9 | 2 | 14 | 15 | | |
| 10 | 1 | 16 | | | |
| 11 | 1 | 17 | | | |
| 12 | 2 | 18 | 19 | | |
| 13 | 2 | 20 | 21 | | |
| 14 | 2 | 22 | 23 | | |

| Index | Count | Positions | | | |
|---|---|---|---|---|---|
| 15 | 2 | 24 | 32 | | |
| 16 | 3 | 25 | 26 | 33 | |
| 17 | 3 | 27 | 34 | 35 | |
| 18 | 4 | 28 | 29 | 36 | 37 |
| 19 | 4 | 30 | 31 | 38 | 39 |
| 20 | 1 | 40 | | | |
| 21 | 1 | 41 | | | |
| 22 | 2 | 42 | 43 | | |
| 23 | 2 | 44 | 45 | | |
| 24 | 2 | 46 | 47 | | |
| 25 | 2 | 48 | 56 | | |
| 26 | 2 | 49 | 57 | | |
| 27 | 4 | 50 | 51 | 58 | 59 |
| 28 | 4 | 52 | 53 | 60 | 61 |
| 29 | 4 | 54 | 55 | 62 | 63 |

METHOD OF EXTRACTING ERROR FOR PEAK SIGNAL TO NOISE RATIO (PSNR) COMPUTATION IN AN ADAPTIVE SCALABLE TEXTURE COMPRESSION (ASTC) ENCODER

FIELD

The present disclosure relates to an adaptive scalable texture compression (ASTC) encoder, and more particularly, to a method of extracting error for peak signal to noise ratio (PSNR) computation in the ASTC encoder.

BACKGROUND

Methods, apparatuses, and articles of manufacture consistent with the present disclosure relate to extracting error for peak signal to noise ratio (PSNR) computation in an adaptive scalable texture compression (ATSC) encoder.

Generally, in image compression, an uncompressed image is processed to obtain a compressed image. The image processing includes application of one or more algorithms to the uncompressed image. As an example, one such algorithm for image compression is joint photographic experts group (JPEG), which standardized the algorithm.

One type of image is called a texture map or a texture. A texture map is an image that is applicable to a surface of a two-dimensional or three-dimensional object (for example, an object that is represented in a virtual space by wireframe model that includes one or more polygons). Similar to images, texture maps are compressed using one or more image compression techniques to obtain compressed textures which are easily stored in a database or quickly communicated over a network. Advanced scalable texture compression (ASTC) is a standard compression algorithm developed by ARM and is predominantly used for texture compression.

In general, peak signal to noise ratio (PSNR) affects image compression or texture compression as the PSNR reflects the compression quality. For achieving efficient compression, the value of the PSNR should be high. Hence, it is advantageous to compute the PSNR of the image which is being encoded while the encoding is in progress.

The existing texture compression techniques use block-based encoding. In order to compute the PSNR for a particular block mode for encoding, the error difference between the original raw data to the reconstructed data is derived. The error difference between the raw image data and reconstructed data is due to the compression process which is lossy. The compressed block is decoded through the decoder and the reconstructed raw data is obtained. The difference between the raw image data and the reconstructed data is computed for extracting the error. Thus, there is a disadvantage in that a decoder is required for decoding the encoded image for extracting the error. Because the decoder is required, additional silicon hardware area is required and also significant power for operating the decoder is consumed.

SUMMARY

It is an aspect to provide a method of extracting error for peak signal to noise ratio (PSNR) computation in an adaptive scalable texture compression (ASTC) encoder.

Accordingly to an aspect of an exemplary embodiment, there is provided a method of extracting error for peak signal to noise ratio (PSNR) computation in an adaptive scalable texture compression (ASTC) encoder, the method comprising identifying, by at least one microprocessor, at least one pixel position of a pixel in a coded block, wherein said at least one pixel position corresponds to an index in a decimated weight block; and extracting, by at least one microprocessor, an error value corresponding to said identified at least one pixel position for said PSNR computation in said ASTC encoder.

Accordingly another aspect of an exemplary embodiment, there is provided an adaptive scalable texture compression (ASTC) encoder for extracting error in peak signal to noise ratio (PSNR) computation, the ASTC encoder comprising at least one microprocessor configured to identify at least one pixel position of a pixel in a coded block, wherein said at least one pixel position corresponds to an index in a decimated weight block; and extract an error value corresponding to said identified at least one pixel position for said PSNR computation.

Accordingly another aspect of an exemplary embodiment, there is provided a computer program product comprising computer executable program code recorded on a computer readable non-transitory storage medium, said computer executable program code when executed causing a computer to identify at least one pixel position of a pixel in a coded block, wherein said at least one pixel position corresponds to an index in a decimated weight block; and extracting an error value corresponding to said identified at least one pixel position for peak signal to noise ratio (PSNR) computation in an adaptive scalable texture compression (ASTC) encoder.

According to another aspect of an exemplary embodiment, there is provided a method of computing a peak signal to noise ratio (PSNR) in an adaptive scalable texture compression (ASTC) encoder, the method comprising selecting a coded block for encoding; obtaining a decimate weight estimate block for the selected coded block; determining error values for pixel positions in the coded block using the obtained decimate weight estimate block; and computing the PSNR using the determined error values.

These and other aspects of the exemplary embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the exemplary embodiments herein without departing from the spirit thereof, and the exemplary embodiments herein include all such modifications.

BRIEF DESCRIPTION OF FIGURES

Exemplary embodiments are illustrated in the accompanying drawings, throughout which like reference letters indicate corresponding parts in the various figures. The exemplary embodiments herein will be better understood from the following description with reference to the drawings, in which.

DETAILED DESCRIPTION OF EXEMPLARY EMBODIMENTS

The exemplary embodiments herein and the various features and advantageous details thereof are explained more fully with reference to the non-limiting exemplary embodiments that are illustrated in the accompanying drawings and detailed in the following description. Descriptions of well-known components and processing techniques are omitted so as to not unnecessarily obscure the exemplary embodiments herein. Also, the various exemplary embodiments described herein are not necessarily mutually exclusive, as some exemplary embodiments may be combined with one or more other exemplary embodiments to form new exemplary embodiments. The term "or" as used herein, refers to a non-exclusive or, unless otherwise indicated. The examples used herein are intended merely to facilitate an understanding of ways in which the exemplary embodiments herein can be practiced and to further enable those skilled in the art to practice the exemplary embodiments herein. Accordingly, the examples should not be construed as limiting the scope of the exemplary embodiments herein.

It is common in computer graphics systems to generate colors for sampling positions in an image to be displayed by applying textures or texture data to the surfaces to be drawn. For example, surface detail on objects may be generated by applying a predefined "texture" to a set of graphics primitives (such as polygons) representing the object, to give the rendered image of the object the appearance of the texture. Such textures are typically applied by storing an array of texture elements or "texels", each representing given texture data (such as color, luminance, and/or light/shadow values) at a given location (position), and then mapping the texels onto the corresponding elements, such as a set of sampling positions, for the image to be displayed. The stored arrays of texture elements (data) are typically referred to as texture maps.

Such arrangements can provide relatively high image quality, but have a number of disadvantages. In particular, the storage of the texture data and accessing the stored texture data in use can lead to higher storage capacity and increased processing load on a graphics processing device. This increased processing load is particularly significant for power constrained devices, such as mobile phones and other handheld devices that perform graphics processing, as these devices are inherently limited in their storage, bandwidth and power resources.

Thus, the texture data is compressed and stored in a compressed form so as to reduce the storage and bandwidth that may be imposed on a graphics processing device when using textures.

Texture compression techniques typically determine a reduced set or palette of colors (or other data) to be used for a given texture map, and then store for each texture element (texel) in the texture map, an index into the set or palette of colors, which indicates the color to be used for the texture element. This technique has the advantage that only an index, rather than a full color, value needs to be stored for each texel.

As discussed above, existing texture compression techniques use block-based encoding, in which the overall array of texture elements to be encoded is divided into an array of small blocks (such as blocks of 4×4 texels or 8×8 texels), with each such block then encoded (compressed), and decoded, separately. This technique can help to make the decoding process more efficient, because the decoder, for example, may need to decode only one or a few of the encoded blocks to determine the value of a texel of interest, rather than the entire encoded texture.

As also discussed above, it is advantageous to compute the PSNR of the image which is being encoded while the encoding is in progress. In order to compute the PSNR for particular block mode for encoding, the compressed block is decoded through the decoder and the reconstructed raw data is obtained. The difference between the raw image data and the reconstructed data is computed for extracting the error. Thus, there is a disadvantage in that a decoder is required for decoding the encoded image for extracting the error. Because the decoder is required, there are additional disadvantages in that additional silicon hardware area is required and also significant power for operating the decoder is consumed.

The exemplary embodiments herein achieve a method of extracting error for peak signal to noise ratio (PSNR) computation in an adaptive scalable texture compression (ASTC) encoder. The method includes identifying one or more pixel positions of one or more pixels in a coded block. The one or more pixel positions correspond to an index in a decimated weight block. The error value of the pixel in the coded block corresponds to a plurality of components of the pixel such as Red, Green, Blue and Alpha.

The method includes extracting an error value of the identified one or more pixel positions for the PSNR computation in the ASTC encoder.

Further, the method includes storing the extracted error value of the identified one or more pixel positions in a buffer of the ASTC encoder.

When the error values are stored in the buffer, the PSNR is computed by reading the error values from the buffer of the ASTC encoder. The size of the buffer is frequently monitored and the extracted error values are sent to the buffer. Each error value is fetched from the buffer during PSNR computation.

Prior to describing the exemplary embodiments in detail, it is useful to describe the weight-on weight method herein. The method includes computing a plurality of neighboring weights contributing to error value of a pixel in a coded block For example, the coded block can be 4×4 block, 8×8 block, and 16×16 and so on. The error value of the pixel in the coded block corresponds to the plurality of components of the pixel such as Red, Green, Blue and Alpha.

The method includes computing a weight corresponding to each neighboring weight. There exist one or more neighboring weights that contribute to the error value of each pixel in the coded block. The weight corresponding to each neighboring weight is computed. For example, consider a coded block of size 8×8 that contains 0 to 63 pixel positions. For each pixel position, there exists one or more neighboring weights in the decimated weight estimate (an array, which is obtained by decimating the coded block).

The method includes determining whether the computed weight corresponding to the last neighboring weight is non-zero. For example, for a pixel 55, when the neighboring weights are assumed to be 23, 24, 28 and 29, and the computed weight for the last neighboring weight (29) is non-zero, then 29 is considered as the neighboring weight contributing to the error value of the pixel 55 in the coded block.

If it is determined that the computed weight corresponding to the last neighboring weight is non-zero, the method includes extracting an error value of the last neighboring weight for PSNR computation.

If it is determined that the computed weight corresponding to the last neighboring weight is zero, then the method includes extracting the error value of the weight preceding the last neighboring weight for PSNR computation.

The method includes storing the error value of the weight preceding the last neighboring weight in the buffer.

Unlike related art methods, the weight-on weight method completely avoids need for a decoder path for sample reconstruction and error computation. With the weight-on weight method, the silicon hardware area for PSNR computation will be reduced by ten times, and the power consumption is also reduced accordingly. Further, the weight-on weight method provides a common scheme that can be adopted for all block footprints of the ASTC encoder. Further, the weight-on weight method facilitates dynamic computation of PSNR along with block encoding. The weight-on weight method provides an efficient amount of error data storage as only four error values of R, G, B and Alpha are stored in the buffer for a coded block at any given time instant, thus reducing the need for storing all the error values for the coded block.

Referring now to the drawings and more particularly to FIGS. 1 to 7 where similar reference characters denote corresponding features consistently throughout the figures, there are shown exemplary embodiments.

Figure 1:
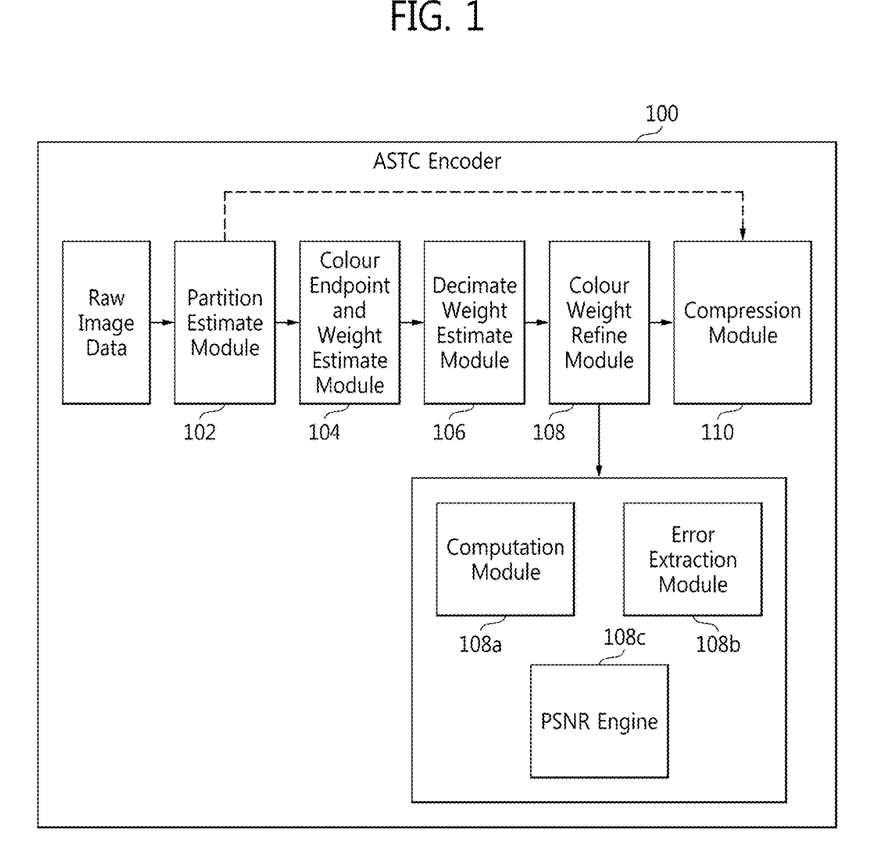
FIG. 1 illustrates a block diagram of an adaptive scalable texture compression (ASTC) encoder for extracting error in peak signal to noise ratio (PSNR) computation, according to exemplary embodiments.

FIG. 1 illustrates a block diagram of an adaptive scalable texture compression (ASTC) encoder for extracting error in peak signal to noise ratio (PSNR) computation, according to exemplary embodiments. As depicted in the FIG. 1, an ASTC encoder 100 includes a partition estimate module 102, a color endpoint and weight estimate module 104, a decimate weight estimate module 106, a color weight refine module 108 and a compression module 110. The color weight refine module 108 includes a computation unit 108a, an error extraction unit 108b and a PSNR engine 108c. Raw image data, for example a texture map, is provided as an input to the partition estimate module 102.

The partition estimate module 102 identifies a best partition pattern for a given block foot print. There are a maximum of 1024 partition patterns for a given block foot print as specified in ASTC standard.

The partition estimate module 102 initially checks for uniformity of texels. If all components are with constant color, then the partition estimate module 102 sets a IsVoidExtent flag to ON. Further, the partition estimate module 102 bypasses all modules to encode the block as void extent block in the compression module 110. This bypass is shown by the dotted arrow in FIG. 1.

If IsVoidExtent equals to zero, then the partition estimate module 102 applies a K-Mean clustering algorithm to group block texels into different partitions. A partition pattern is then extracted from the K-Mean clustering. Then the extracted partition pattern is compared to pre-defined partition patterns to select N number of best partition patterns. Finally, the partition estimate module 102 selects a partition pattern with least partition error.

The color endpoint and weight estimate module 104 may be configured to select a block mode for encoding. The texture map is divided into blocks of a given size, for example 16×16, 8×8, 4×4 or the like. The selected block mode for encoding is known as the coded block.

The decimate weight estimate module 106 may be configured to obtain a decimate weight estimate for the selected block mode. For example, when the color endpoint and weight estimate module 104 selects 8×8 block for encoding, then the decimate weight estimate module 106 may be configured to obtain the decimated weight estimate as a 5×6 block. The decimated weight estimate 5×6 block is a subset of 8×8 block.

The color weight refine module 108 may be configured to identify an efficient sampling in the ASTC encoder 100 for extracting error values in PSNR computation. The identification of the efficient sampling point is performed at a final stage of the color weight refine module 108. The error values are extracted using a plurality of modules in the color weight refine module 108 as shown in the FIG. 1.

The computation modules 108a is configured to compute the plurality of neighboring weights contributing to the error value of pixel in the coded block. The error value of the pixel in the coded block corresponds to the plurality of components of the pixel such as Red, Green, Blue and Alpha. There exist one or more neighboring weights in the decimated weight estimate that contribute to the error value for each pixel in the coded block.

The computation modules 108a is configured to compute the weight corresponding to each neighboring weight. For each neighboring weight in the decimated weight estimate, the weight is computed.

It is determined whether the computed weight corresponding to the last neighboring weight is non-zero. The computed weight corresponding to the last neighboring weight may be either zero or non-zero.

In an exemplary embodiment, the computation modules 108a may be configured to identify one or more pixel positions of pixels in the coded block.

In an exemplary embodiment, the error extraction modules 108b can be configured to extract the error value of the identified one or more pixel positions for the PSNR computation.

In an exemplary embodiment, the error extraction modules 108b can be configured to extract the error value of the identified one or more pixel positions for PSNR computation when it is determined that the computed weight corresponding to the last neighboring weight is non-zero.

The error extraction modules 108b can be configured to extract the error value of the weight preceding to the last neighboring weight, when it is determined that the computed weight corresponding to the last neighboring weight is zero.

The extracted error values of the pixels at the identified one or more pixel positions are stored in the buffer of the ASTC encoder 100.

When the error values are stored in the buffer, the PSNR engine 108c may be configured to compute the PSNR by reading the error values from the buffer of the ASTC encoder 100. The size of the buffer is frequently monitored and the extracted error values are sent to the buffer. Each error value is fetched from the buffer for computation of PSNR.

The compression module 110 packs quantized weight, quantized color end point data and block level control information like block mode, partition information, CEM configuration to form 128-bit compressed data. Each block foot-print holds 128-bit of compressed data and is stored into bit-stream block by block in raster scan order. This 128-bit compressed data is stored into the bit-stream.

Figure 2:
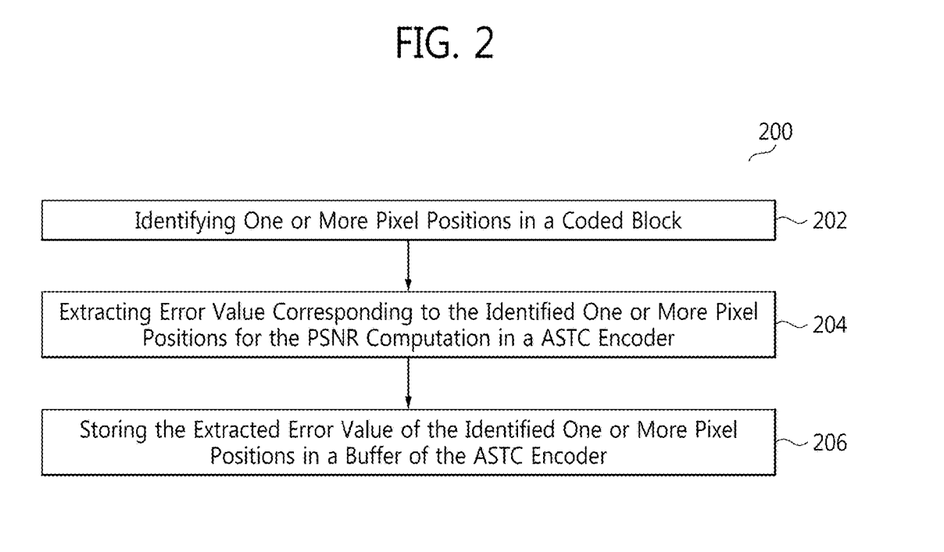
FIG. 2 is a flow diagram illustrating a method of extracting error for PSNR computation in the ASTC encoder, according to the exemplary embodiments.

FIG. 2 is a flow diagram illustrating a method of extracting error for PSNR computation in the ASTC encoder, according to the exemplary embodiments. The method and other descriptions herein provide a basis for a control program, which may be implemented using a microcontroller, microprocessor, or a computer reading computer code stored in a computer readable storage medium.

At operation 202, a method 200 includes identifying one or more pixel positions of pixels in the coded block. The computation module 108a may identify the one or more pixel positions in the coded block.

At operation 204, the method 200 includes extracting an error value corresponding to the identified one or more pixel positions for the PSNR computation in the ASTC encoder 100. The error extraction module 108b may extract the error value corresponding to the pixels at the identified one or more pixel positions for the PSNR computation in the ASTC encoder 100.

At operation 206, the method 200 includes storing the extracted error value of the pixels at the identified one or more pixel positions in a buffer of the ASTC encoder 100.

The PSNR is computed using the equation as given below.

$$PSNR = 10 \cdot \log_{10}\left(\frac{MAX_I^2}{MSE}\right) \rightarrow (1)$$

$$MSE = \frac{1}{mn}\sum_{i=0}^{m-1}\sum_{j=0}^{n-1}[I(i,j) - K(i,j)]^2$$

Further, the various actions, units, operations, blocks, or acts described in the method 200 can be performed in the order presented, in a different order, simultaneously, or a combination thereof. Furthermore, in some exemplary embodiments, some of the actions, units, operations, blocks, or acts listed in the FIG. 2 may be omitted.

Figure 3A:
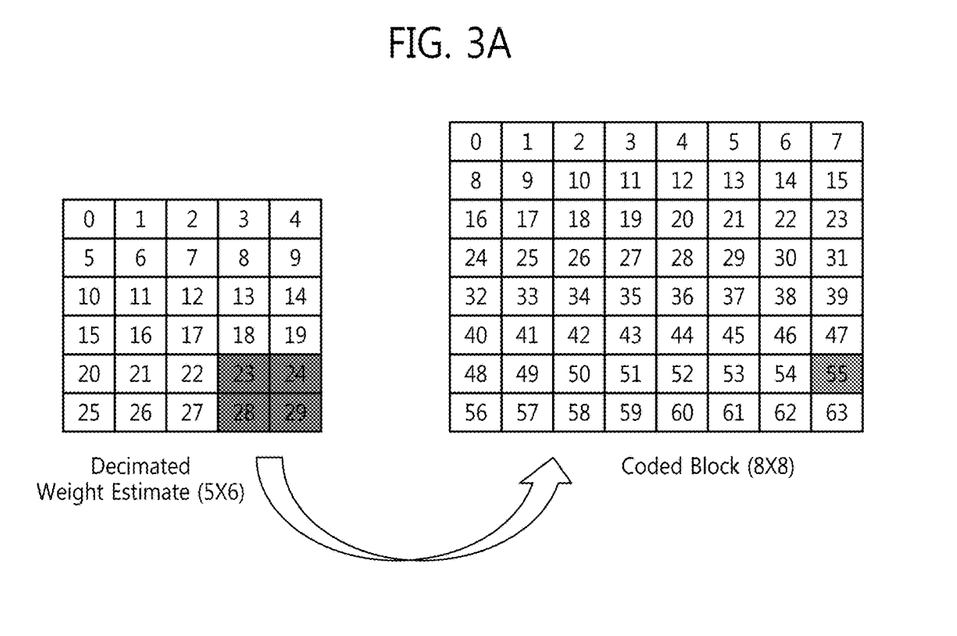
FIGS. 3A, 3B and 3C show example illustrations for computing a plurality of neighboring weights and identifying a last neighboring weight contributing to error value of a pixel in a coded block, according to the exemplary embodiments.
Figures 3B, 3C:
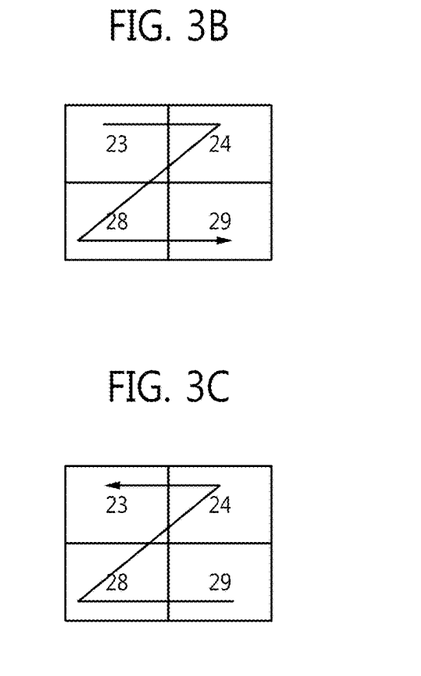

FIGS. 3A, 3B and 3C show example illustrations for computing a plurality of neighboring weights and identifying a last neighboring weight contributing to an error value of a pixel in a coded block, according to the exemplary embodiments. In the non-limiting example shown in FIG. 3A, the coded block of size 8×8 is selected for encoding. A decimated weight estimate of size 5×6 is obtained from the 8×8 coded block. However, these sizes are only an example, and other sizes may be used.

The error value of a pixel in coded block is dependent on four neighboring weights in the decimated weight estimate. In the coded block, the error value of the pixel at pixel position 55 is dependent on the four neighboring weights such as 23, 24, 28 and 29 in the decimated weight estimate as shown in FIG. 3A.

The weight corresponding to each of the neighboring weights 23, 24, 28 and 29 are computed for obtaining the error value of the pixel at pixel position 55 in the coded block. With reference to the FIG. 3A, the neighboring weights 23, 24, 28 and 29 contribute to the error value of the pixel at pixel position 55 in the coded block. The error value of the pixel at pixel position 55 is calculated four times while refining the neighboring weights one after another as shown in FIG. 3B, as the four neighboring weights contribute to the error value. When the weights are computed for each of the neighboring weights, it is determined whether the computed weight for the neighboring weights is non-zero.

If the computed weight for the last neighboring weight (29, in the above example) is non-zero, then the last neighboring weight 29 contributing to the error value is considered as the error value for the pixel at pixel position 55 in the coded block.

If the computed weight for the last neighboring weight (29, in the above example) is zero, then the weight preceding the last neighboring weight is determined. If the weight preceding the last neighboring weight is non-zero then the weight preceding the last neighboring weight is considered as the error value for the pixel at pixel position 55 in the coded block. In the above example, the weight preceding the last neighboring weight is 28, and when the computed weight of 28 is determined as non-zero, then 28 is considered as the neighboring weight contributing to the error value of the pixel at pixel position 55 in the coded block.

Further, if the computed weight of 28 is determined as zero, then the weight preceding the neighboring weight 28 (which is 24 in this example) is determined. If the computed weight of 24 is non-zero, then 24 is considered as the neighboring weight contributing to the error value of the pixel at pixel position 55 in the coded block as shown in FIG. 3B.

The error value of the last neighboring weight is extracted and stored in the buffer of the ASTC encoder 100, when it is determined that the computed weight corresponding to the last neighboring weight is non-zero. On the other hand, when it is determined that the computed weight corresponding to the last neighboring weight is zero, then the error value of the weight preceding to the last neighboring weight is considered as the error value contributing to the pixel in the coded block as described above.

Figure 4:
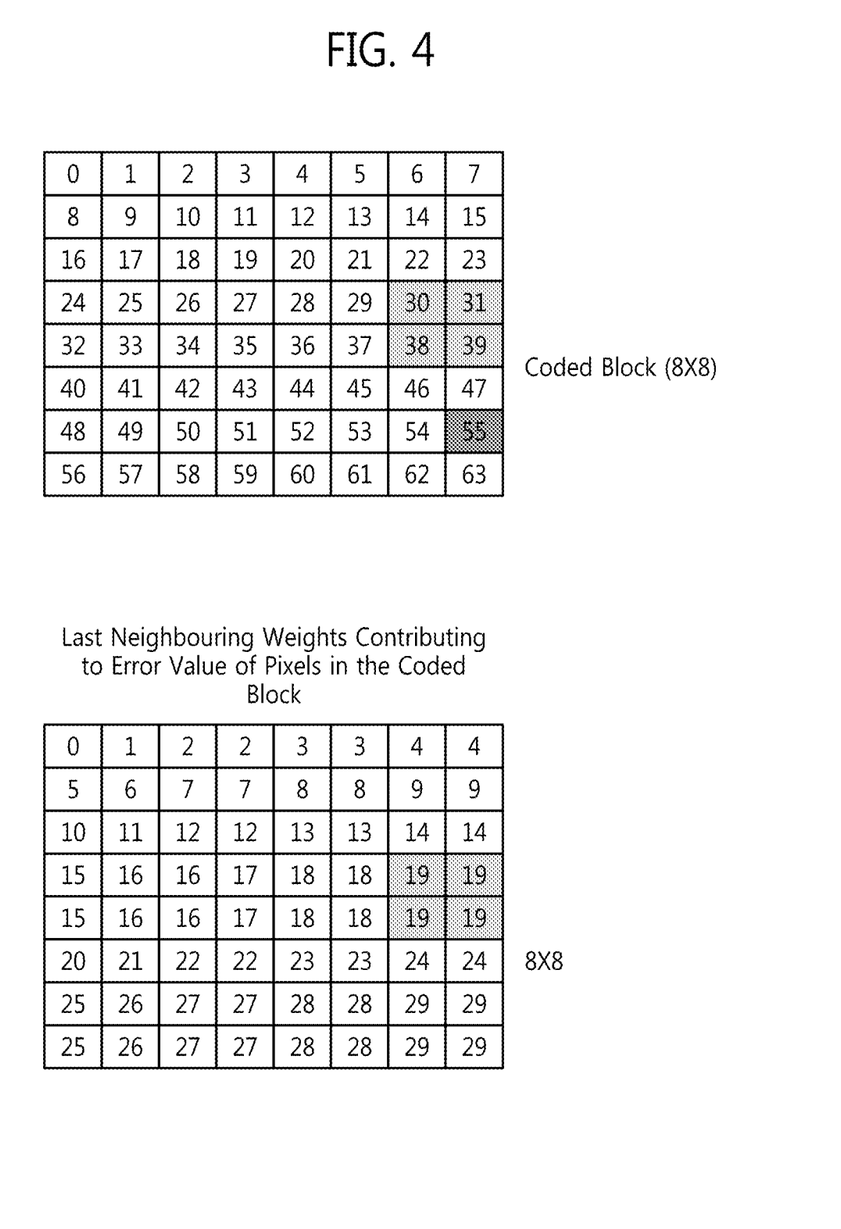
FIG. 4 shows the last neighboring weights contributing to the error value of the pixel in the coded block, according to the exemplary embodiments.

FIG. 4 shows the last neighboring weights contributing to the error value of a pixel at a pixel position in the coded block, according to the exemplary embodiments. The last neighboring weights contributing to the error value of all the pixels (from 0 to 63) in the 8×8 coded block is shown in a 8×8 block in the FIG. 4. In the above example, for the pixel position 55, the last neighboring weight contributing to the error value of the pixel position 55 is determined as 29 and the computed weight of 29 is also determined as non-zero. Hence, 29 is considered as the last neighboring weight contributing to the error value of the pixel 55 in the 8×8 coded block. Similarly, as shown in the FIG. 3A, the last neighboring weight 29 is also considered as the neighboring weight contributing to the error value of the pixel position 55 in the 8×8 coded block. The last neighboring weight 19 is considered as the neighboring weight contributing to the error value of the pixel positions 30, 31, 38 and 39 in the 8×8 coded block.

Figure 5:
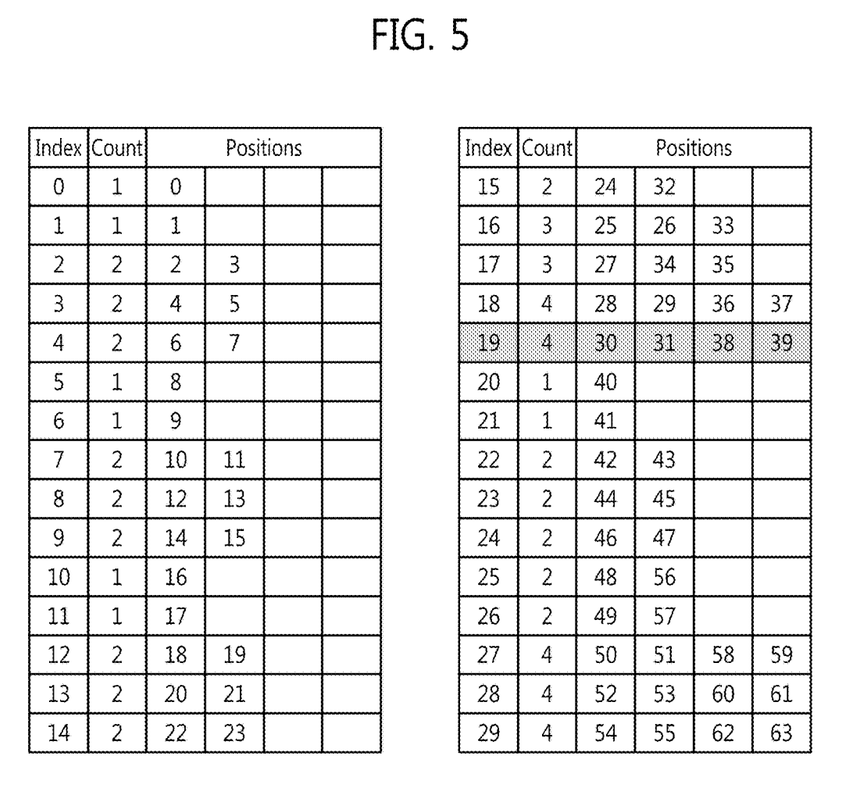
FIG. 5 shows an array which includes the last neighboring weights contributing to the error value of the pixel in the coded block indicated with index, according to the exemplary embodiments.

FIG. 5 shows an array which includes the last neighboring weights contributing to the error value of the pixel position in the coded block indicated with index, according to the exemplary embodiments. The array containing an index, count and positions is shown in the FIG. 5. In the FIG. 5, the index denotes the weights in the decimated weight estimate. The count represents the number of pixel positions in the 8×8 block the index impacts and the positions indicate the respective pixel positions in the 8×8 block. The last neighboring weight 19 contributes to the error value of the pixel positions 30, 31, 38 and 39 in the 8×8 coded block as shown in FIGS. 4 and 5. In a similar way the last neighboring weight 28 contributes to the error value of the pixel positions 52, 53, 60 and 61 in the 8×8 coded block.

Referring to the index 23 in the FIG. 5, it should be noted that while refining the index 23 in the decimated weight estimate, the error value of the pixel positions 44 and 45 will not change further. Since there is no effect on the error value of the pixel positions 44 and 45 after refining the index 23 in the coded block, the error values of the identified pixel positions 44 and 45 are stored in the buffer of the ASTC encoder 100.

Hence, the error values of the pixel positions 44 and 45 are identified in the coded block and the error values of the identified pixel positions 44 and 45 are stored in the buffer of the ASTC encoder 100 while refining the index 23 in the decimated weight estimate. Similarly for index 13, the identified pixel positions are 20 and 21, i.e., after the pixel positions 20 and 21 the error value will not change further after refining the decimated weight index 13.

For each index in the decimated weight estimate, the one or more pixel positions in the coded block are identified. The error values of the identified one or more pixel positions are stored in the buffer while refining each index in the decimated weight estimate. For example, as shown in the FIG. 5, maximum of four error values of the pixel positions are stored in the buffer of the ASTC encoder 100. Thus, with the above described method, the need for storing all the error values for the coded block can be avoided. The computation module 108a can be configured to derive the relation between the indexes in the decimated weight grid to that of the pixel positions in the coded block as shown in the FIG. 5.

Figure 6:
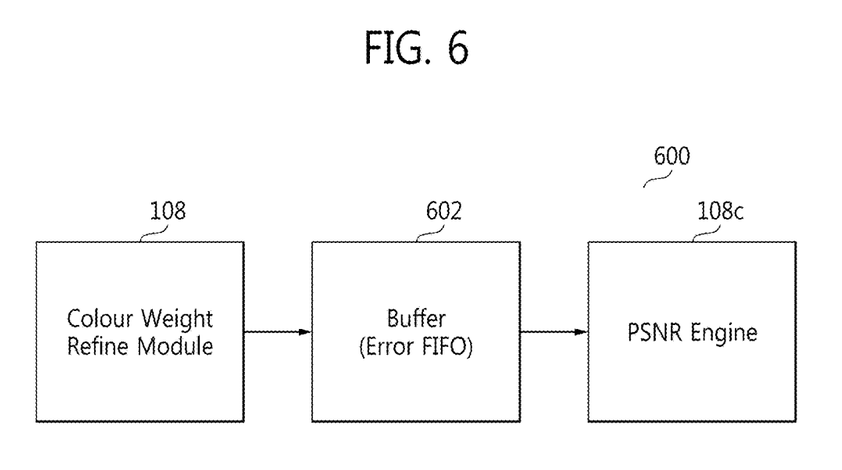
FIG. 6 illustrates a block diagram with various modules for PSNR computation, according to the exemplary embodiments.

FIG. 6 illustrates a block diagram with various modules for PSNR computation, according to the exemplary embodiments. A block diagram 600 includes the color weight refine module 108, a buffer (error first-in, first-out (FIFO)) 602 and a PSNR engine 108c. The error values extracted from the weight refine module 108 are stored in the buffer 602. When the error values are stored in the buffer, the PSNR is computed by reading the error values from the buffer of the ASTC encoder. The size of the buffer is frequently monitored and the extracted error values are sent to the buffer. Each error value is fetched from the buffer for computation of PSNR in the PSNR engine 108c.

The PSNR is computed using the equation as given below.

$$PSNR = 10 \cdot \log_{10}\left(\frac{MAX_I^2}{MSE}\right) \rightarrow (1)$$

$$MSE = \frac{1}{mn}\sum_{i=0}^{m-1}\sum_{j=0}^{n-1}[I(i,j) - K(i,j)]^2$$

Figure 7:
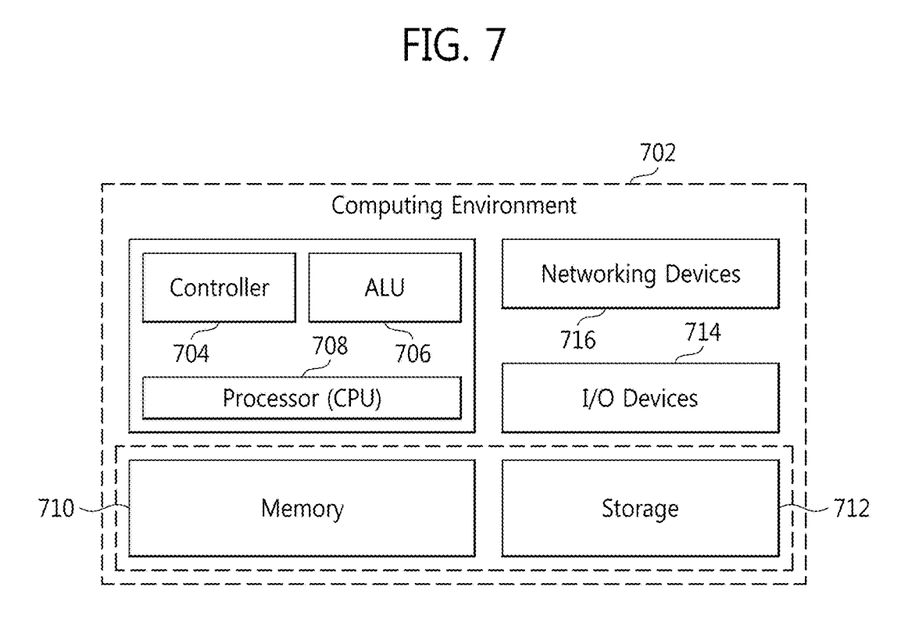
FIG. 7 illustrates a computing environment implementing the method of extracting error for PSNR computation in the ASTC encoder, according to the exemplary embodiments.

FIG. 7 illustrates a computing environment implementing the method of extracting error for PSNR computation in the ASTC encoder, according to the exemplary embodiments as disclosed herein. As shown in FIG. 7, a computing environment 702 comprises at least one processor 708 that is equipped with a controller 704 and an Arithmetic Logic Unit (ALU) 706, a memory 710, a storage 712, plurality of networking devices 716 and a plurality Input/Output (I/O) devices 714. The processor 708 is responsible for processing the instructions of the algorithm. The processor 408 receives commands from the controller 704 in order to perform processing. Further, any logical and arithmetic operations involved in the execution of the instructions are computed with the help of the ALU 406.

The overall computing environment 702 can be composed of multiple homogeneous and/or heterogeneous cores, multiple CPUs of different kinds, special media and other accelerators. The processor 708 is responsible for processing the instructions of the algorithm. Further, the plurality of processors 708 may be located on a single chip or over multiple chips.

The algorithm comprising of instructions and codes for the implementation of the above-described method are stored in either the memory 710 or the storage 712, or both. At the time of execution, the instructions may be fetched from the memory 710 and/or the storage 712, and executed by the processor 708.

In case of hardware implementations various networking devices 716 or external I/O devices 714 may be connected to the computing environment to support the implementation.

The exemplary embodiments disclosed herein can be implemented through at least one software program running on at least one hardware device and performing network management functions to control the elements. The elements shown in FIGS. 1 to 7 include blocks which may be at least one hardware device, or may be a combination of hardware devices and software modules.

The foregoing description of the specific exemplary embodiments will fully reveal the general nature of the exemplary embodiments herein that others can, by applying current knowledge, readily modify and/or adapt for various applications such specific exemplary embodiments without departing from the generic concept, and, therefore, such adaptations and modifications should and are intended to be comprehended within the meaning and range of equivalents of the disclosed exemplary embodiments. It is to be understood that the phraseology or terminology employed herein is for the purpose of description and not of limitation. Therefore, while the exemplary embodiments herein have been described in terms of exemplary embodiments, those skilled in the art will recognize that the exemplary embodiments herein can be practiced with modification within the spirit and scope of the exemplary embodiments as described herein.

What is claimed is:

1. A method of extracting error for peak signal to noise ratio computation in an adaptive scalable texture compression encoder, the method comprising:
   identifying, by at least one microprocessor, at least one pixel position of a pixel in a coded block, wherein said at least one pixel position corresponds to an index in a decimated weight block; and
   extracting, by the at least one microprocessor, an error value corresponding to said at least one pixel position that has been identified for said peak signal to noise ratio computation in said adaptive scalable texture compression encoder.

2. The method of claim 1, further comprising:
   storing said error value in a buffer of said adaptive scalable texture compression encoder.

3. The method of claim 1, wherein said error value corresponds to a plurality of components of the pixel at the at least one pixel position.

4. An adaptive scalable texture compression encoder for extracting error in peak signal to noise ratio computation, the adaptive scalable texture compression encoder comprising:
   at least one microprocessor configured to:

identify at least one pixel position of a pixel in a coded block, wherein said at least one pixel position corresponds to an index in a decimated weight block; and extract an error value corresponding to said at least one pixel position for said peak signal to noise ratio computation.

5. The adaptive scalable texture compression encoder of claim 4, wherein the at least one microprocessor is further configured to:

store said error value in a buffer.

6. The adaptive scalable texture compression encoder of claim 4, wherein said error value corresponds to a plurality of components of the pixel at the at least one pixel position.

7. A computer program product comprising computer executable program code recorded on a computer readable non-transitory storage medium, said computer executable program code when executed causing a computer to:

identify at least one pixel position of a pixel in a coded block, wherein said at least one pixel position corresponds to an index in a decimated weight block; and extracting an error value corresponding to said at least one pixel position for peak signal to noise ratio computation in an adaptive scalable texture compression encoder.

8. The method of claim 1, wherein the decimated weight block is smaller in size than the coded block.

9. A method of computing a peak signal to noise ratio in an adaptive scalable texture compression encoder, the method comprising:

selecting, by at least one microprocessor, a block for encoding;

obtaining, by the at least one microprocessor, a decimate weight estimate block for the block that has been selected;

determining, by the at least one microprocessor, error values for pixel positions in the block that has been selected using the decimate weight estimate block; and computing, by the at least one microprocessor, the peak signal to noise ratio using the error values.

10. The method of claim 9, wherein the error values are determined without decoding a compressed block through a decoder to produce reconstructed data for determining the error values.

11. The method of claim 9, wherein, for each pixel position, a plurality of neighboring weights contributing to an error value of the pixel at the pixel position in the block that has been selected are computed, using the decimate weight estimate block; and the error values for the pixel positions are determined based on a computed weight corresponding to a last neighboring weight.

12. The method of claim 9, wherein the decimate weight estimate block is smaller than the block that has been selected.

* * * * *